UNITED STATES PATENT OFFICE.

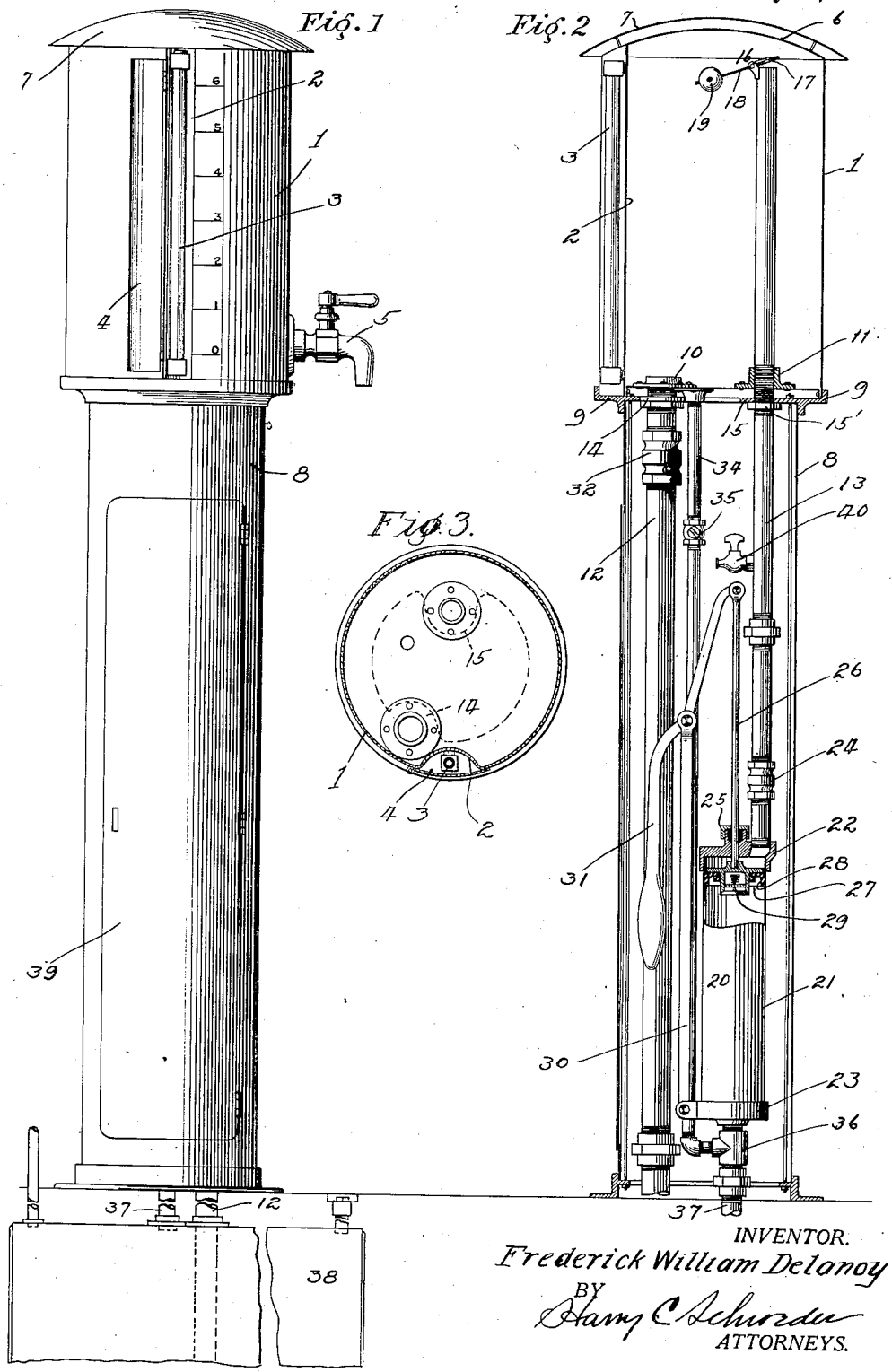

FREDERICK WILLIAM DELANOY, OF ALAMEDA, CALIFORNIA, ASSIGNOR OF ONE-HALF TO FRED NELSON DELANOY, OF ALAMEDA, CALIFORNIA.

LIQUID-MEASURING DEVICE.

1,235,120.      Specification of Letters Patent.      Patented July 31, 1917.

Application filed January 3, 1916. Serial No. 69,807.

*To all whom it may concern:*

Be it known that I, FREDERICK WILLIAM DELANOY, a citizen of the United States, residing at Alameda, in the county of Alameda and State of California, have invented certain new and useful Improvements in Liquid-Measuring Devices, of which the following is a specification.

This invention relates to liquid measuring devices and more particularly to means for measuring and storing gasolene and other volatile liquids. The principal object of my invention is to provide means for storing inflammable liquids whereby the same are readily accessible and easily measured, and but a limited quantity is held above ground at any one time thereby eliminating any danger from the storage of a large quantity.

Another object of my invention is to fill the auxiliary storage tank with an inflammable liquid by means of a vacuum system so that any defect which may occur in the measuring tank will cause the contents thereof to flow back into the main storage receptacle all of the operations taking place without discharging the vapor laden air into the outside atmosphere.

Another object of my invention is to so shape the tank that the gage glass thereof is protected and may be entirely closed.

Another object of my invention is to provide a compact form wherein the pump and all the valve parts may be secured when there is no attendant in charge.

Another object of my invention is to provide means whereby an exact quantity of liquid is caused to flow into the measuring tank, the same means also preventing the surplus liquid from flowing back into the vacuum pump.

With these and other objects in view my invention consists in the novel construction, combination and arrangement of parts herein illustrated and more specifically pointed out in the appended claims.

Reference being had to the accompanying drawings forming a part of this specification, Figure 1 is a view in front elevation of my improved auxiliary storage tank and the various mechanisms associated therewith.

Fig. 2 is a view in section through the same.

Fig. 3 is a view in horizontal section through the storage tank.

Referring to corresponding parts in the several views by the same numerals of reference, 1 denotes the measuring tank, which is constructed of such size that it will comply with the various government and insurance regulations regarding the storage of inflammable liquids above ground. This tank is provided on one side with the concave portion 2, where is attached a gage glass 3, and graduations are provided enabling the amount of contents to be read at a glance. By this means the gage glass is effectively protected against accidental injuries, and to further protect the same, I provide a hinged door 4, which when closed makes a practical continuous contour with the curve of the tank itself.

The tank is provided with a faucet 5 to which may be attached a hose for the purpose of filling the tanks of automobiles. The upper portion of the tank is preferably of dome shape, as shown at 6, and in spaced relation is a reflector 7 to prevent the sun from impinging directly on the tank with the consequent evaporation of the contents.

The tank is mounted upon a suitable frame 8, having on the upper portion an annular flanged ring 9, wherein the tank is seated. The bottom of the tank itself is provided with flanges 10 and 11 with which the pipes 12 and 13 are in threaded engagement. The annular ring 9 has extensions 14 and 15, through which the pipes 12 and 13 pass, and on the under side are provided with lock nuts 15', thereby securely fastening the tank to the base.

Pipe 13 extends upwardly in to the tank to a point adjacent the top thereof, where it is provided with the hinged valve 16. This valve has the disk 17 adapted to close the upper end of pipe 13, and to which is attached a rod 18 having the float 19 adjustably mounted thereon. The weight of this float is sufficient to normally hold the disk 17 above the pipe, but when the liquid reaches a predetermined height, it closes over the end of the pipe and prevents any further suction in the line 13, and thereby any chance of the liquid flowing down into the pipe 13.

An air pump is denoted by 20, to which pipe 13 is connected in such a manner that air is exhausted through this pipe from the tank 1. The pump consists of the cylindrical tube 21, the upper cap 22 and the lower cap 23, the pipe 13 is screwed into the upper cap and just above the pump is provided with a check valve 24 to hold vacuum in the tank 1. The cap 22 is also provided with the gland 25, through which extends pump rod 26, which within the cylinder is provided with the head 27, having the usual cup leather 28, and having a spring actuated valve 29 in the center of the head, the leather and valve 29 being both arranged to produce a suction on the upper side of the head.

On one side of the lower cap 23 is pivotally mounted a link 30, to the upper end of which is pivotally mounted the operating handle 31, the free end of this handle being pivotally mounted to the upper end of the pump rod 26. Thus when the handle is actuated the link 30 swings about its lower pivoted point and allows the upper end to move in a vertical line. This construction also enables the handle to be folded within the casing when not in use. The pipe 12 is provided adjacent the upper end with a check valve 32, arranged to allow the liquid to flow from the storage tank 38 into the measuring tank, but prevents the contents from flowing back into 38. A third pipe 34 is connected to the bottom of the tank 1 and provided with a valve 35, the lower end of the pipe being connected through the T 36 with the pipe 37 leading from the pump back to the main storage tank 38. By this arrangement the air is exhausted from tank 1 into the storage tank and from this tank through the exhaust pipe 45 into the atmosphere. This arrangement being such that the fumes containing explosive vapors are exhausted in such a manner as to eliminate fire risk. Pipe 13 is provided intermediate the check valve 24 and its upper end with a small cock 40, to provide a vent when drawing the contents of tank 1, through the cock 5 or when allowing the said contents to flow through the pipe 34 into the storage reservoir 38.

The operation is as follows:—

When it is desired to fill the tank 1, the handle 31 is operated, thus reciprocating the pump head 27 exhausting the air through pipe 13 from the upper part of tank 1 and discharging it through the pipe 37. The vacuum thus created within the measuring tank causes the liquid to flow from the main storage tank up to the pipe 12 into the tank 1. This operation is continued until the required amount of liquid as indicated by the graduations is pumped into the auxiliary tank when the same is held by means of check 32.

When it is desired to draw the contents the cock 40 is opened allowing air to flow upwardly through the pipe 13, releasing the vacuum in the upper part of the auxiliary tank, when by turning the faucet 5 the contents may be withdrawn. In like manner if it is desired to completely empty the tank 1 back into the reservoir, then the valve 35 is opened as well as cock 40, that the contents may flow downwardly through the pipes 34 and 37 into the storage tank.

It will be apparent that from the foregoing description that I have provided an improved device for handling volatile liquids, especially those of which the vapor is inflammable, as all the various operations take place without the discharge of vapor laden air into the atmosphere, and operating on the vacuum principle preventing operation at all if there is a leak in the measuring tank.

While I have shown the preferred construction of my invention it will be understood that changes may be made in minor details of construction without departing from the scope of the claims.

What I claim and wish to cover by Letters Patent is:—

1. A liquid measuring device comprising the combination with a storage reservoir, a measuring tank, a vacuum pump, a connecting pipe from said reservoir to said tank, a suction line from said pump to said tank and a discharge line from said pump to said reservoir.

2. A liquid measuring device comprising the combination with a storage reservoir, a supply line leading from the bottom of said reservoir to the bottom of said tank, a discharge line from the top of said tank to the top of said reservoir, and a vacuum pump in said discharge line to exhaust the air from said tank.

3. A liquid measuring device comprising the combination with a storage reservoir, a supply line leading from the bottom of said reservoir to the bottom of said tank, a discharge line from the top of said tank to the top of said reservoir, a float valve attached to said discharge line within said tank, and a vacuum pump in said discharge line to exhaust the air from said tank.

In testimony whereof I affix my signature.

FREDERICK WILLIAM DELANOY.